United States Patent [19]
Ishikawa et al.

[11] Patent Number: 5,919,290
[45] Date of Patent: Jul. 6, 1999

[54] RELEASE AGENT

[75] Inventors: Hiroki Ishikawa; Tsutomu Naganawa; Isao Ona, all of Chiba Prefecture, Japan

[73] Assignee: Dow Corning Toray Silicone Co., Ltd., Tokyo, Japan

[21] Appl. No.: 09/124,143

[22] Filed: Jul. 29, 1998

[30] Foreign Application Priority Data

Jul. 31, 1997 [JP] Japan ..................................... 9-220080

[51] Int. Cl.$^6$ ..................................................... C09K 3/18
[52] U.S. Cl. ....................... 106/2; 106/38.22; 106/287.14
[58] Field of Search ......................... 106/2, 38.22, 287.14

[56] References Cited

U.S. PATENT DOCUMENTS

| | | | |
|---|---|---|---|
| 4,889,677 | 12/1989 | Hashimoto et al. ................. | 106/38.22 |
| 5,130,460 | 7/1992 | Kamei et al. ............................ | 556/449 |
| 5,138,012 | 8/1992 | Riding et al. ........................... | 525/478 |
| 5,449,712 | 9/1995 | Gierke et al. ............................. | 106/2 |
| 5,531,814 | 7/1996 | Bahr et al. ............................... | 106/3 |
| 5,599,778 | 2/1997 | Ishikawa et al. ....................... | 508/208 |
| 5,604,039 | 2/1997 | Chen et al. ............................... | 106/2 |

*Primary Examiner*—Anthony Green
*Attorney, Agent, or Firm*—Larry A. Milco

[57] ABSTRACT

A release agent comprising a mixture of (A) a dimethylpolysiloxane and (B) an organopolysiloxane with phenolic hydroxyl groups, said mixture having an average phenol equivalent within the range of 10,000 to 5,000,000 and a dimethylsiloxane oligomer with less than 20 silicon atoms in an amount of less than 5,000 ppm, said agent having a viscosity within the range of $5 \times 10^{-5}$ to $1 \times 10^{-1}$ m$^2$/s at 25° C. The release agent of the present invention possesses excellent heat-resistant and release properties, and suppresses formation of formaldehyde under the effect of thermal decomposition.

14 Claims, No Drawings

RELEASE AGENT

FIELD OF THE INVENTION

The present invention relates to a release agent, more particularly, to a release agent of the type that possesses excellent resistance to heat, excellent release properties, and the ability of suppressing formation of formaldehyde under the effect of thermal decomposition.

BACKGROUND OF THE INVENTION

As organopolysiloxane oils possess good heat-resistant and release properties, they find wide application in toner release agents for Xerography, as well as in mold-release agents used in molding thermoplastic, thermosetting resins, or various rubbers. However, when dimethylpolysiloxane oils, which are typical representatives of organopolysiloxane oils, are used in mold-release agents, they are often subject to thermal decomposition because the temperature on the walls of the mold often exceeds 150° C. When this temperature exceeds 200° C., the thermal decomposition process is vigorously intensified, and this causes problems associated either with the formation of a viscous gel-like composition, or with the formation of a formaldehyde that possesses harmful properties. Furthermore, in high-speed Xerography (hereinafter referred to as "electrophotography") heat rollers operate under high-temperature conditions of about 200° C. Therefore, when dimethylpolysiloxane oils are used as toner-release agents, they are subject to thermal decomposition which is accompanied by the formation of formaldehyde. The recent demand for an increase in mold production and for a decrease in fixation, led to an increase in the temperature of molds and heat rollers of electrophotographic equipement. In response to this demand, the authors have developed a release agent (see Japanese Laid-Open Patent Application (Kokai) 7-216376) with improved heat-resistant properties, this agent comprising a diorganopolysiloxane which contains phenol groups.

However, the aforementioned release agent often contains dimethylsiloxane oligomers with less than 20 silicon atoms in an amount of 20,000 to 200,000 ppm. Therefore, when this agent is used at high temperatures over a long period of time, the aforementioned dimethylsiloxane oligomers are evaporated and either contaminate surfaces, e.g., of exhaust fans, with a sticky substance, or the oily substance pours down and contaminates the mold. Another serious problem is that the aforementioned dimethylsiloxane oligomer is oxidized and turns into a silicon-dioxide powder which is harmful to electronic components that are in the vicinity. In particular, it is difficult to obtain clear copies when the silicon dioxide powder adheres to the surface of a corotron in electrophotographic equipment.

SUMMARY OF THE INVENTION

The authors carried out a thorough study aimed at the solution of the problems described above. As a result of this study it has been found that the aforementioned problems can be solved and at the same time the formation of the harmful formaldehyde can be suppressed, if a mixture is prepared of dimethylpolysiloxane and organopolysiloxane with phenolic hydroxyl groups, and if an average phenol equivalent of the aforementioned mixture, as well as the amount of the dimethylsiloxane oligomer with less than 20 silicon atoms and the viscosity of the mixture be specified within predetermined ranges.

More specifically, it is an object of the present invention to provide a release agent that possesses excellent resistance to heat, excellent release properties, and the ability of suppressing formation of formaldehyde under the effect of thermal decomposition.

A release agent of the invention comprises a mixture of (A) a dimethylpolysiloxane and (B) an organopolysiloxane with phenolic hydroxyl groups, the aforementioned mixture having an average phenol equivalent within the range of 10,000 to 5,000,000 and a dimethylsiloxane oligomer with less than 20 silicon atoms in an amount of less than 5,000 ppm, said agent having a viscosity within the range of $5 \times 10^{-5}$ to $1 \times 10^{-1}$ m$^2$/s at 25° C.

DETAILED DESCRIPTION OF THE INVENTION

The component (A) dimethylpolysiloxane suitable for the purposes of the present invention is a compound that has a linear or a partially-branched linear molecular structure. Molecular terminals of this compound usually have methyl or hydroxyl groups. It is recommended that at 25° C. this composition have a viscosity within the range of $5 \times 10^{-5}$ to $1 \times 10^{-1}$ m$^2$/s, preferably between $1 \times 10^{-3}$ and $5 \times 10^{-2}$ m$^2$/s. This is because with the viscosity less than $5 \times 10^{-5}$ m$^2$/s, the composition will possess volatility and will not demonstrate sufficient release properties. If, on the other hand, the viscosity exceeds $1 \times 10^{-1}$ m$^2$/s, it would be difficult to handle the release agent because of its high viscosity. Furthermore, it is preferable that the dimethylpolysiloxane oligomer of this component contain less than 500 ppm of the dimethylsiloxane oligomer with less than 20 silicon atoms. Here, the aforementioned dimethylsiloxane oligomer with less than 20 silicon atoms is a linear-chain dimethylsiloxane oligomer of the following general formula:

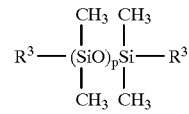

where $R^3$ is a hydroxyl or a methyl group, and "p" is an integer between 0 and 19; and a cyclic dimethylsiloxane oligomer of the following formula:

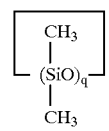

where "q" is an integer between 3 and 20. In this component, it is recommended that the aforementioned dimethylsiloxane oligomer with less than 20 silicon atoms be contained in an amount of less than 500 ppm, preferably less than 400 ppm, and still more preferably, less than 100 ppm. This is because, when the aforementioned dimethylsiloxane oligomer is contained in an amount of more than 500 ppm, it will evaporate, e.g., when the release agent of the present invention is used in a mold under high-temperature conditions. As a result, it will adhere to the surfaces of exhaust fans, or similar equipment and contaminate these surfaces with an oily substance, or the oily substance will pour down and contaminate the surfaces of the molded articles. It is also possible that the aforementioned dimethylsiloxane oligomer is oxidized under the effect of heat and is turned into a silicon dioxide powder which harmfully affects various electronic components located in the vicinity. The linear dimethylsiloxane oligomer with 20 silicon atoms and is volatile.

The dimethylpolysiloxane of component (A) is obtained, e.g., by subjecting a cyclic dimethylsiloxane oligomer to equilibrium polymerization with the use of an acid or a basic catalyst in the presence of a terminal blocking agent, and obtaining by stripping a dimethylpolysiloxane which contains 5,000 to 30,000 ppm of dimethylsiloxane oligomer with less than 20 silicon atoms, the aforementioned dimethylsiloxane oligomer being then removed by thin-film evaporation technique under a pressure of 0.1 to 15 mmHg. Alternatively, the aforementioned dimethylsiloxane oligomer can be extracted and removed with the use of methanol, ethanol, n-butanol, isopropyl alcohol, or similar alcohols, acetone, methylethylketone, or similar ketones, hexane, benzene, toluene, xylene, etc., or similar organic solvents or their mixtures. If necessary, the product can be obtained by combining the aforementioned methods for removing the dimethylsiloxane oligomer. It is preferable to remove the dimethylsiloxane oligomer by extraction with organic solvents, but it is even more preferable to remove the dimethylsiloxane oligomer by means of the thin-film evaporation technique and the organic solvent extraction method.

The organopolysiloxane with phenolic hydroxyl groups which constitutes component (B) suitable for the purposes of the present invention may comprise a compound represented, e.g., by the following average structural formula:

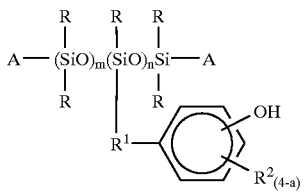

where R may be represented, for example., by a substituted or non-substituted monovalent hydrocarbon group. Suitable R groups include alkyl, such as methyl, ethyl, propyl, hexyl, and octyl; alkenyl such as vinyl, allyl, and hexenyl; aryl such as phenyl; an arylenealkyl group represented by the following formula: —$CH_2$—$CH(CH_3)$—$C_6H_5$; and a substituted hydrocarbon group such as a 3,3,3-trifluoropropyl group. The methyl group is usually the most preferable among the aforementioned groups. In the above formula, $R^1$ may be represented, for example, by a bivalent hydrocarbon group. Suitable $R^1$ groups include alkylene, such as ethylene, propylene, butylene, isobutylene, or a similar alkylene group; and an alkylenearylene group. Most preferable among the above are ethylene groups or propylene groups. $R^2$ may be represented by a monovalent organic group, and by a substituted or non-substituted monovalent hydrocarbon groups of the same type as defined above for R. For example $R^2$ can be hydroxyl or alkoxy such as, methoxy, ethoxy, or similar alkoxy groups. "A" is a substituted or non-substituted monovalent hydrocarbon group of the same type as defined above for R, or a phenolic hydroxyl-containing group represented by the following formula:

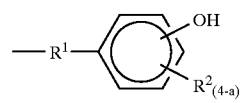

where $R^1$ and $R^2$ are the same as defined above, and "a" is an integer from 0 to 4. Most preferable among the hydroxyl groups in the phenolic ring are those which are bonded in the ortho-, meta-, para-positions, etc. The following are examples of appropriate phenolic hydroxyl-containing groups:

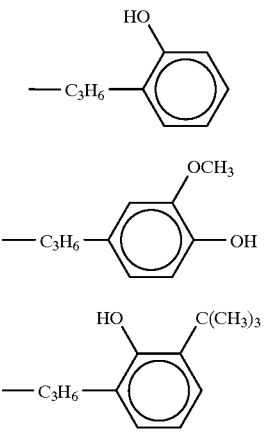

where "a" is an integer from 0 to 4, "m" is an integer greater than 1, "n" is an integer greater than 0, and "m+n" is a number that provides a viscosity which at 25° C. is within the range of $5\times10^{-5}$ to $1\times10^{-1}$ $m^2$/s. When "n" is 0, "A" is a phenolic hydroxyl-containing group represented by the aforementioned formula. It preferable that, in the component under consideration, the organopolysiloxane with phenolic hydroxyl groups contain less than 50,000 ppm of the dimethylsiloxane oligomer with less than 20 silicon atoms. Such an organopolysiloxane with phenolic hydroxyl groups may be obtained by adding, in the presence of an addition reaction catalyst such as a chloroplatinic acid, p-allylphenol to an organopolysiloxane having silicon-bonded hydrogen atoms. The product is then subjected to stripping under a reduced pressure of 20 to 50 mmHg at a temperature of 150 to 180° C., and the dimethylsiloxane oligomer is removed to a possible extent. The final product is produced by a thin-film evaporation technique with removal of the dimethylsiloxane oligomer with less than 20 silicon atoms.

A release agent of the present invention is prepared by mixing aforementioned components (A) and (B), brining the average phenol equivalent to a value within the range of 10,000 to 5,000,000, reducing the amount of dimethylsiloxane oligomer with less than 20 silicon atoms to less than 5,000 ppm, and adjusting the 25° C. viscosity to a value within the range of $1\times10^{-2}$ to $1\times10^{-1}$ $m^2$/s. The aforementioned release agent of the present invention may be obtained, e.g., by combining 180 parts of the A-component dimethylpolysiloxane (having $1\times10^{-3}$ $m^2$/s viscosity and 0 ppm quantity of the dimethylsiloxane oligomer with less than 20 silicon atoms) with 120 parts of the B-component organopolysiloxane with phenolic hydroxyl groups which is represented by the following average structural formula:

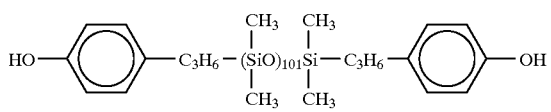

and has a viscosity of $2.5 \times 10^{-4}$ m²/s, an average phenol equivalent equal to 3,900, and contains 2500 ppm of the dimethylsiloxane oligomer with less than 20 silicon atoms. The mixture is then adjusted to an average phenol equivalent of 10,000, $5.75 \times 10^{-4}$ m²/s viscosity, and 1,000 ppm content of dimethylsiloxane oligomer with less than 20 silicon atoms.

Although the release agent of the invention always contains a mixture of the aforementioned components (A) and (B), this mixture may be combined with the following additives: mica, talc, zinc oxide, calcium carbonate, or similar inorganic materials in a powdered form; paraffin, wax or a similar organic substance; toluene, xylene, hexane, heptane, rubber volatile oil, or similar organic solvents. The release agent of the present invention may be emulsified and used as an emulsion. The emulsion can be prepared by combining the mixture of components (A) and (B) with water and polyoxyalkylenealkyl ethers, polyoxyalkylenealkylphenol ethers, polyoxyalkylenealkyl esters, sorbitanealkyl esters, polyoxyalkylenesorbitanalkyl esters, or similar nonionic surface-active agents; dodecylbenzene sulfonate, higher alcohol ester sulfate, or similar anionic surface-active agents. The aforementioned substances may be of one, two, or more than two types, and emulsification is performed by a conventional method.

The release agent of the present invention may find application as a spinning die release agent, electrophotography toner release agent, die-cast and cast-molding release agent, rubber-mat, hose, tire mold release agent, plastic mold release agent, etc. The release agent of the invention may be added as a component to the following substances for improving their mold-release properties: a phenol resin, epoxy resin, urea resin, melamine resin, or a similar thermosetting resin; polyvinylchloride, polyethylene, polypropylene, vinyl acetate, or copolymers of the above, as well as nylon, polyester, polystyrene, a copolymer of acrylonitrile and styrene, a copolymer of acrylonitrile, butadiene, and styrene, ester polyacrylate, polyurethane, polyacetal, or a similar thermoplastic resin; a silicone rubber, isoprene rubber, styrene-butadiene rubber, chloropropylene rubber, or a similar organic or natural rubber.

EXAMPLES

The invention will be further described with reference to the examples. In these examples, all parts are parts by weight and viscosities are those measured at 25° C. The amount of dimethylsiloxane oligomer with less than 20 silicon atoms was measured by gas chromatography. The following methods were used for evaluating heat-resistant properties, release properties, presence of volatility in the dimethylsiloxane oligomer, and the amount of formaldehyde produced in the process:

Heat-Resistant Properties

Two (2) grams of a release agent are loaded into a 2 cm-deep 5 cm-diameter aluminum cup. The cup is placed into a 200° C. hot-air circulation type oven for 100 hours, 200 hours, and 300 hours, and then the condition of the agent is visually observed. Judgement on the heat-resistant properties is based on the following criteria:

○—good (viscosity did not increase; no gelation is observed).

Δ—poor to some extent (Formation of a thin film on the surface, however, the inner portion maintains fluidity).

X—poor (Full gelation, the entire agent is turned into a rubber-like substance).

Release Properties

After applying a release agent onto the mirror-finished surface of the iron mold for molding rubber plates having the following dimensions: 25 cm×25 cm×0.5 cm, the mold was heated for 15 hours at 200° C. After cooling, the mold was immersed into a container with a toluene-type solvent and cleaned with light shaking. The mold was filled with a non-vulcanized styrenebutadiene rubber, and vulcanization was carried out for 15 min under pressure of 20 kg/cm² and at a temperature of 150° C. Release properties of the rubber were then measured after vulcanization.

Presence of Volatility in Dimethylsiloxane Oligomer

The release agent was loaded in an amount of 25 cm³ into a 100-cm³ beaker, and after being covered with a 300-cm³ beaker, the agent was heated for 5 hours at 200° C. Presence of volatility was evaluated by observing whether or not the dimethylsiloxane oligomer precipitated on the side walls of the beaker.

Amount of Formaldehyde Formed in the Process

After accurately weighing the sample vessel with the release agent, the content was heated to 200° C., and heat treatment was then continued for 5 hours with the supply of air at a rate of 100 ml/min. Formaldehyde formed in this process was derived from liquid collection (0.2%, 2,4-DNP, 2N-HCl solution). The obtained derivative was extracted by chloroform, and the amount (ppm) of formaldehyde formed in the process was measured by HPLC analysis.

Reference Example 1

The following two types of dimethylpolysiloxane were prepared for use as component (A).

Sample A

Dimethylpolysiloxane having a molecular chain blocked with trimethylsiloxy groups, produced by an equilibrium polymerization method, having viscosity of $1 \times 10^{-4}$ m²/s, and containing 27,600 ppm of the dimethylsiloxane oligomer with less than 20 silicon atoms was passed twice at 270° C. and a reduced pressure of 3 to 4 mmHg through a thin-film evaporator having a column length of 4.5 m. The amount of aforementioned dimethylsiloxane oligomer was reduced to 3,400 ppm. After alcohol extraction was repeated 7 times with three-fold amounts of ethanol, 2 hours of shaking, and 2 hours of static retention, a dimethylpolysiloxane having the molecular chain blocked with trimethylsiloxy groups, containing 8 ppm of the dimethylsiloxane oligomer with less than 20 silicon atoms, and having $1.09 \times 10^{-4}$ m²/s viscosity was produced.

Sample B

Dimethylpolysiloxane having a molecular chain blocked with trimethylsiloxy groups, produced by an equilibrium polymerization method, having viscosity of $1 \times 10^{-2}$ m²/s, and containing 3,430 ppm of the dimethylsiloxane oligomer with less than 20 silicon atoms was subjected to the same treatment as aforementioned Sample A, whereby a dimethylpolysiloxane having the molecular chain blocked with trimethylsiloxy groups, containing 0 ppm of the aforementioned dimethylsiloxane oligomer, and having $1.001 \times 10^{-2}$-$m^2/s$ viscosity was produced.

Reference Example 2

The following two types of organopolysiloxanes with phenolic hydroxyl groups were prepared for use as component (B).

Sample C

A $7.02 \times 10^{-4}$-$m^2/s$ viscosity organopolysiloxane having phenolic hydroxyl groups, having phenol equivalent of 4,440, and containing 8,500 ppm of the aforementioned dimethylsiloxane oligomer was obtained by passing an organopolysiloxane, having phenolic hydroxyl groups and containing 136,700 ppm of the dimethylsiloxane oligomer with less than 20 silicon atoms, twice through a table-type thin-film evaporator (Shinko Fuadora Co.) at 200° C. and at 2 to 3 mmHg. The aforementioned organopolysiloxane was represented by the following average structural formula:

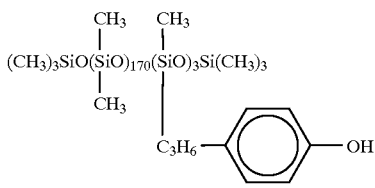

and was obtained by an addition reaction of p-allylphenol to an organohydridopolysiloxane obtained by an equilibrium polymerization and represented by the following average structural formula:

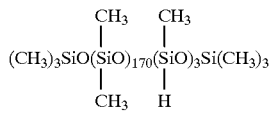

Sample D

A $1.07 \times 10^{-4}$-$m^2/s$ viscosity organopolysiloxane having phenolic hydroxyl groups, having phenol equivalent of 1,500, and containing 7,600 ppm of the aforementioned dimethylsiloxane oligomer was obtained by passing an organopolysiloxane, having phenolic hydroxyl groups and containing 143,200 ppm of the dimethylsiloxane oligomer with less than 20 silicon atoms, twice through a table-type thin-film evaporator (Shinko Fuadora Co.) at 200° C. and at 2 to 3 mmHg. The aforementioned organopolysiloxane was represented by the following average structural formula:

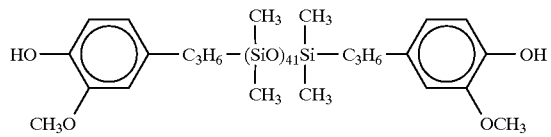

and was obtained by an addition reaction of p-allyl(2-methoxy)phenol to an organohydridopolysiloxane obtained by an equilibrium polymerization and represented by the following average structural formula:

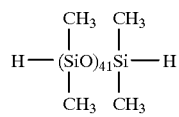

Example 1

90 parts of Sample A and 10 parts of Sample C were uniformly mixed, and then a release agent having an average phenol equivalent of 44,400, having a viscosity of $1.21 \times 10^{-4}$ $m^2/s$, and containing 857 ppm of a dimethylsiloxane oligomer having less than 20 silicon atoms was produced. The release agent was tested with regard to its thermal resistance, presence of volatility in the dimethylsiloxane oligomer, and the amount of formaldehyde formed in the process. The results are shown in Table 1 which contains final estimations of respective release agents.

Comparative Example 1

A release agent having an average phenol equivalent of 44,400, a viscosity of $1.20 \times 10^{-4}$ $m^2/s$, and containing 25,690 ppm of the dimethylsiloxane oligomer with less than 20 silicon atoms was produced by the same method as in Practical Example 1, with the exception that a dimethylpolysiloxane having a viscosity of $1 \times 10^{-4}$ $m^2/s$ and containing 27,600 ppm of the dimethylsiloxane oligomer with less than 20 silicon atoms was used instead of the dimethylpolysiloxane of Sample (A). The release agent was tested with regard to its thermal resistance, presence of volatility in the dimethylsiloxane oligomer, and the amount of formaldehyde formed in the process. The results are shown in Table 1 which contains final estimations of respective release agents.

Comparative Example 2

A release agent having a viscosity of $1.09 \times 10^{-4}$ $m^2/s$ and containing 8 ppm of the dimethylsiloxane oligomer with less than 20 silicon atoms was produced by the same method as in Practical Example 1, with the exception that Sample C was not used. The obtained release agent was tested with regard to its thermal resistance, presence of volatility in the dimethylsiloxane oligomer, and the amount of formaldehyde formed in the process. The results are shown in Table 1 which contains final estimations of respective release agents.

Comparative Example 3

A release agent having a phenol equivalent of 4,440, a viscosity of $7.02 \times 10^{-4}$ $m^2/s$, and containing 8,500 ppm of the dimethylsiloxane oligomer with less than 20 silicon atoms was produced by the same method as in Practical Example 1, with the exception that Sample A was not used. The obtained release agent was tested with regard to its thermal resistance, presence of volatility in the dimethylsiloxane oligomer, and the amount of formaldehyde formed in the process. The results are shown in Table 1 which contains final estimations of respective release agents.

Comparative Example 4

A release agent having an average phenol equivalent of 8,880,000, a viscosity of $1.09 \times 10^{-4}$ $m^2/s$, and containing 9 ppm of the dimethylsiloxane oligomer with less than 20 silicon atoms was produced by uniformly mixing 0.05 parts of Sample C with 999.95 parts of Sample A. The obtained release agent was tested with regard to its thermal resistance, presence of volatility in the dimethylsiloxane oligomer, and the amount of formaldehyde formed in the process. The results are shown in Table 1 which contains final estimations of respective release agents.

thermal resistance, release properties, and the amount of formaldehyde formed in the process. The results are shown in Table 2 which contains final estimations of respective release agents.

TABLE 1

|  | Present Invention | Comparative Examples | | | |
|---|---|---|---|---|---|
|  | Pr. Ex. 1 | Comp. Ex. 1 | Comp. Ex. 2 | Comp. Ex. 3 | Comp. Ex. 4 |
| (A) Component |  |  |  |  |  |
| Sample A | 90 | — | 90 | — | 999.95 |
| Unpurified dimethyl-polysiloxane | — | 90 | — | — | — |
| B) Component Sample C | 10 parts | 10 parts | — | 10 parts | 0.05 parts |
| Phenol equivalent | 44,400 | 44,400 | — | 4,440 | 8,880,000 |
| Quantity of dimethylsiloxane oligomer (ppm) | 857 | 25,690 | 8 | 8,500 | 9 |
| Viscosity (m²/s) | $1.21 \times 10^{-4}$ | $1.20 \times 10^{-4}$ | $1.09 \times 10^{-4}$ | $7.02 \times 10^{-4}$ | $1.09 \times 10^{-4}$ |
| Thermal resistance |  |  |  |  |  |
| 100 hours | ○ | ○ | Δ | Δ | ○ |
| 200 hours | ○ | ○ | X | Δ | Δ |
| 300 hours | ○ | ○ | X | X | X |
| Presence or absence of volatility in dimethylsiloxane oligomer | No oligomer precipitation on the walls | Oligomer (oily drops) stuck to the walls of the beaker is observed | No oligomer precipitation is observed | Only traces of oligomer (oily drops) stuck to the walls of the beaker are observed | No oligomer precipitation is observed |
| Quantity of developed formaldehyde (ppm) | 9 | 10 | 45 | 12 | 39 |
| Final evaluation of the release agent | Suitable | Unsuitable | Unsuitable | Unsuitable | Unsuitable |

Example 2

A release agent having a viscosity of $9.54 \times 10^{-3}$ m²/s, having an average phenol equivalent of 150,000, and containing 76 ppm of the dimethylsiloxane oligomer with less than 20 silicon atoms was produced by uniformly mixing 1 part of Sample D with 99 parts of Sample B. The obtained release agent was tested with regard to its thermal resistance, release properties, and the amount of formaldehyde formed in the process. The results are shown in Table 2 which contains final estimations of respective release agents.

Comparative Example 5

A release agent a viscosity of $1.001 \times 10^{-2}$ m²/s, and containing 0 ppm of the dimethylsiloxane oligomer with less than 20 silicon atoms was produced by the same method as in Example 2, with the exception that Sample D was not used. The obtained release agent was tested with regard to its thermal resistance, release properties, and the amount of formaldehyde formed in the process. The results are shown in Table 2 which contains final estimations of respective release agents.

Comparative Example 6

A release agent having an average phenyl equivalent of 1,500, a viscosity of $1.07 \times 10^{-4}$ m²/s, and containing 7,600 ppm of the dimethylsiloxane oligomer with less than 20 silicon atoms was produced by the same method as in Example 2, with the exception that Sample B was not used. The obtained release agent was tested with regard to its

TABLE 2

|  | Present Invention | Comparative Examples | |
|---|---|---|---|
|  | Pr. Ex. 2 | Comp. Ex. 5 | Comp. Ex. 6 |
| Component (A) Sample B | 99 parts | 99 parts | — |
| Component (B) Sample (D) | 1 part | — | 1 part |
| Phenol equivalent | 150,000 | — | 1,500 |
| Quantity of dimethylsiloxane oligomer (ppm) | 76 | 0 | 7,600 |
| Viscosity (m²/s) | $9.54 \times 10^{-3}$ | $1.001 \times 10^{-2}$ | $1.07 \times 10^{-4}$ |
| Thermal resistance |  |  |  |
| 100 hours | ○ | Δ | ○ |
| 200 hours | ○ | X | Δ |
| 300 hours | ○ | X | Δ |
| Release properties | Good | Not released, unsatisfactory | Rubber surface partially sticks to the mold; unsatisfactory. |
| Quantity of developed formaldehyde (ppm) | 8 | 43 | 12 |
| Final evaluation of the release agent | Suitable | Unsuitable | Unsuitable |

Example 3

An emulsion was produced by combining 30 parts of a release agent of the present invention, comprising a mixture of 10 parts of Sample C and 90 parts of Sample A, with 1.3 parts of a polyoxyethylene (8.5 mole addition) nonylphenol ether type emulsifier, 3.5 of a polyoxyethylene (8.5 mole addition) lauryl ether type emulsifier, and 65.2 parts of water with subsequent emulsification of the mixture in a colloid-mill type emulsification apparatus. The obtained emulsion was diluted with 30 parts of water and was used as a release agent for a snow-tire mold of a vehicle tire having an intricate tread.

Alternatively, an emulsion was prepared using a release agent produced in Comparative Example 3 (with the use only of Sample C). This emulsion also was used as a release agent for a vehicle snow tire mold.

The results of the tests showed that initially no difference was observed between the use of both emulsions. However, as the use of the emulsions continued, the emulsion of Comparative Example 3 began to produce a small amount of tar on the upper die of the BAG-O-MATIC vulcanization apparatus. At the same time, the dimethylsiloxane oligomer with less than 20 silicon atoms was detected. Furthermore, as molding was continued with the use of the emulsion of Comparative Example 3, the surfaces of the tires were contaminated with stains of the aforementioned dimethylsiloxane oligomer. However, no contamination with the dimethylsiloxane oligomer was observed with the continued use of the emulsion of Practical Example 1.

Example 4

4.5 kg of a 6-nylon resin chips and 0.5 kg of a release agent of the present invention in the form of a mixture of 10 parts of Sample C and 90 parts of Sample A were combined as follows. The nylon resin chips were melted and kneaded with predetermined dosed flows of both components by setting the temperature at 260° C. and adjusting the proportioning pump and the dosing device of a small-scale pelletizer so that the ratio of the release agent of the invention to the chips was 10 wt %. The product was cooled and then cut into 3 mm-long pieces by passing through 3 mm-diameter slits. As a result, master chips with an addition of 10 wt % of the release agent of the invention were produced for use in resin molds. Two-kilogram portions of the chips were placed into individual vats, the temperature was set to 150° C., and then the chips were dried for 24 hours in a mini-jet oven having length of 30 cm, width of 30 cm, and height of 25 cm, heated with a nichrome wire. When drying was completed, no traces of contamination were found on the oven ceiling, and sticking of silicon dioxide powder on the surface of the nichrome wire heater was not noticed.

For comparison, master chips were prepared by the same method with the use of the release agent of Comparative Example 3 (with Sample C alone), and the chips were dried. After drying was complete, the dimethylsiloxane oligomer with less than 20 silicon atoms stuck to the surface of the oven ceiling. Small quantity of the white powder of silicon dioxide adhered to the surface of the nichrome wire heater.

The release agent of the invention, which comprises a mixture of aforementioned components (A) and (B) with an average phenol equivalent of the aforementioned mixture within the range of 10,000 to 5,000,000, and with the dimethylsiloxane oligomer with less than 20 silicon atoms in an amount of less than 5,000 ppm, is characterized by an improved resistance to heat, improved release properties, and by the fact that neither oily products of volatility nor silicon dioxide powder are formed even under high temperature, and that the formation of harmful formaldehyde is suppressed.

That which is claimed is:

1. A release agent composition, comprising:
   (A) a material comprising a dimethylpolysiloxane and
   (B) a material comprising an organopolysiloxane having phenolic groups,
wherein the composition has an average phenol equivalent of from 10,000 to 5,000,000, contains less than 5,000 ppm of a dimethylsiloxane oligomer having less than 20 silicon atoms, and has a viscosity of from $5 \times 10^{-5}$ to $1 \times 10^{-1}$ m$^2$/s at 25° C.

2. The composition according to claim 1, wherein component (A) has a linear molecular structure.

3. The composition according to claim 1, wherein component (A) has a partially branched linear molecular structure.

4. The composition according to claim 1, wherein component (A) has terminal groups selected from the group consisting of methyl and hydroxyl.

5. The composition according to claim 1, wherein the composition has a viscosity of from $1 \times 10^{-3}$ to $5 \times 10^{-2}$ m$^2$/s at 25° C.

6. The composition according to claim 1, wherein component (A) contains less than 500 ppm of a dimethylsiloxane oligomer having less than 20 silicon atoms.

7. The composition according to claim 6, wherein component (A) contains less than 400 ppm of the dimethylsiloxane oligomer having less than 20 silicon atoms.

8. The composition according to claim 7, wherein component (A) contains less than 100 ppm of the dimethylsiloxane oligomer having less than 20 silicon atoms.

9. The composition according to claim 1, wherein component (A) contains a dimethylsiloxane oligomer having the general formula:

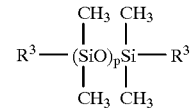

and a dimethylsiloxane oligomer having the general formula:

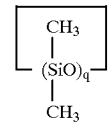

wherein R$^3$ is hydroxyl or methyl, p is an integer from 0 to 19, and q is an integer from 3 to 20.

10. The composition according to claim 1, wherein component (B) comprises a compound having the average formula:

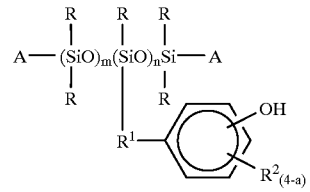

wherein R is a monovalent hydrocarbon group, R$^1$ is a bivalent hydrocarbon group, R$^2$ is a monovalent organic group or a monovalent hydrocarbon group, A is a monovalent hydrocarbon group or a phenolic hydroxyl-containing group having the formula:

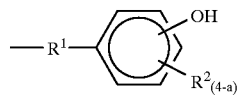

wherein $R^1$ and $R^2$ are as defined above, a is an integer from 0 to 4, and when n is 0, A is the phenolic hydroxyl-containing group having the above formula.

11. The composition according to claim 10, wherein R is methyl and $R^1$ is ethylene or propylene.

12. The composition according to claim 1, further comprising at least one additive selected from the group consisting of an inorganic filler, an organic wax, and an organic solvent.

13. A method of preparing a release agent composition, comprising mixing:

(A) a material comprising a dimethylpolysiloxane and (B) a material comprising an organopolysiloxane having phenolic groups, wherein the composition has an average phenol equivalent of from 10,000 to 5,000,000, contains less than 5,000 ppm of a dimethylsiloxane oligomer having less than 20 silicon atoms, and has a viscosity of from $5\times10^{-5}$ to $1\times10^{-1}$ $m^2/s$ at 25° C.

14. The method according to claim 13, further comprising the steps of:

adding water and a surface-active agent to the composition, wherein the agent is nonionic or anionic, to form a mixture; and emulsifying the mixture.

* * * * *